(12) United States Patent
Jacquemont et al.

(10) Patent No.: US 10,734,702 B2
(45) Date of Patent: Aug. 4, 2020

(54) PAYMENT TERMINAL COMPRISING WIRELESS COMMUNICATIONS MEANS

(71) Applicant: INGENICO GROUP, Paris (FR)

(72) Inventors: Nicolas Jacquemont, Montmeyran (FR); Olivier Berthiaud, Cornas (FR)

(73) Assignee: INGENICO GROUP, Paris (FR)

( * ) Notice: Subject to any disclaimer, the term of this patent is extended or adjusted under 35 U.S.C. 154(b) by 176 days.

(21) Appl. No.: 15/570,109

(22) PCT Filed: Apr. 27, 2016

(86) PCT No.: PCT/EP2016/059449
§ 371 (c)(1),
(2) Date: Oct. 27, 2017

(87) PCT Pub. No.: WO2016/174115
PCT Pub. Date: Nov. 3, 2016

(65) Prior Publication Data
US 2018/0151940 A1     May 31, 2018

(30) Foreign Application Priority Data
May 11, 2015 (FR) .................................. 15 54195

(51) Int. Cl.
*H01Q 1/22* (2006.01)
*G06F 3/02* (2006.01)
(Continued)

(52) U.S. Cl.
CPC ......... *H01Q 1/2216* (2013.01); *G06F 3/0202* (2013.01); *G06F 21/83* (2013.01); *G06Q 20/206* (2013.01); *G06Q 20/341* (2013.01); *G07F 7/1033* (2013.01); *G07F 19/205* (2013.01); *G07G 1/0018* (2013.01); *H01H 13/70* (2013.01); *H01H 13/83* (2013.01); *H01Q 1/24* (2013.01); *H01Q 9/42* (2013.01); *H01H 13/86* (2013.01); *H01H 2219/062* (2013.01); *H01H 2231/006* (2013.01); *H01H 2239/032* (2013.01); *H01Q 1/36* (2013.01)

(58) Field of Classification Search
CPC .................................................. H01Q 1/2216
USPC ....................................................... 235/380
See application file for complete search history.

(56) References Cited

U.S. PATENT DOCUMENTS

2005/0093765 A1* 5/2005 Nagel ................ H01Q 1/36
343/895
2005/0193531 A1* 9/2005 Chang ................ F16B 45/02
24/600.2
(Continued)

FOREIGN PATENT DOCUMENTS

JP    4647027 B1    3/2011
WO   0048142 A1    8/2000

OTHER PUBLICATIONS

International Search Report dated Jun. 30, 2016 for corresponding International Application No. PCT/EP2016/059449, filed Apr. 27, 2016.
(Continued)

*Primary Examiner* — Allyson N Trail
(74) *Attorney, Agent, or Firm* — David D. Brush; Westman, Champlin & Koehler, P.A.

(57) ABSTRACT

A radio-electric antenna is shaped to be positioned in proximity to an insertion hole for a smart-card reader of a payment terminal.

10 Claims, 6 Drawing Sheets

(51) Int. Cl.
| | |
|---|---|
| H01Q 1/24 | (2006.01) |
| H01Q 9/42 | (2006.01) |
| G07F 19/00 | (2006.01) |
| G07F 7/10 | (2006.01) |
| G06Q 20/34 | (2012.01) |
| G06F 21/83 | (2013.01) |
| G06Q 20/20 | (2012.01) |
| G07G 1/00 | (2006.01) |
| H01H 13/70 | (2006.01) |
| H01H 13/83 | (2006.01) |
| H01H 13/86 | (2006.01) |
| H01Q 1/36 | (2006.01) |

(56) References Cited

U.S. PATENT DOCUMENTS

| | | | | |
|---|---|---|---|---|
| 2007/0046550 | A1* | 3/2007 | Park | H01Q 1/243 343/702 |
| 2007/0236396 | A1 | 10/2007 | Gao | |
| 2008/0111749 | A1* | 5/2008 | Nam | H01Q 1/243 343/702 |
| 2009/0253301 | A1* | 10/2009 | Chang | G06K 7/0021 439/620.22 |
| 2011/0187622 | A1* | 8/2011 | Yukimoto | H01Q 1/3241 343/848 |
| 2011/0284629 | A1* | 11/2011 | Top | G01R 31/001 235/379 |
| 2012/0146863 | A1* | 6/2012 | Kwon | H01Q 1/243 343/720 |
| 2013/0186196 | A1* | 7/2013 | Veros | G01F 23/263 73/304 C |
| 2014/0111894 | A1* | 4/2014 | Schug | H01L 27/0248 361/56 |
| 2014/0162490 | A1* | 6/2014 | Hodge | G06K 7/00 439/487 |
| 2014/0327998 | A1* | 11/2014 | Barneron | G06K 7/0082 361/220 |
| 2016/0248145 | A1* | 8/2016 | Ritter | H01Q 1/02 |

OTHER PUBLICATIONS

Written Opinion of the International Searching Authority dated Jun. 30, 2016 for corresponding International Application No. PCT/EP2016/059449, filed Apr. 27, 2016.

English translation of the International Preliminary Report on Patentability dated Oct. 25, 2017 for corresponding International Application No. PCT/EP2016/059449, filed Apr. 27, 2016.

* cited by examiner

PAYMENT TERMINAL COMPRISING WIRELESS COMMUNICATIONS MEANS

CROSS-REFERENCE TO RELATED APPLICATIONS

This Application is a Section 371 National Stage Application of International Application No. PCT/EP2016/059449, filed Apr. 27, 2016, which is incorporated by reference in its entirety and published as WO 2016/174115 A1 on Nov. 3, 2016, not in English.

1. FIELD OF THE INVENTION

The invention relates to the field of payment terminals. The present technique relates more particularly to the field of payment terminals incorporating wireless communications means. More specifically, the present technique relates to payment terminals integrating wireless communications means that use a GPRS, UMTS or again LTE type communications network. Such a communications network relies on the implementation, by a telephony operator, of a set of base stations defining mesh network also called a cell network.

2. PRIOR ART

To carry out secured online transactions, payment terminals integrate different communications means, especially wireless communications means (GPRS, CDMA, UMTS, LTE, Wi-Fi, Bluetooth® etc.). Payment terminals are also becoming increasingly communicative, whether it is to carry out secured online transactions or for any type of service such that a terminal can propose. This is why the performance of wireless communications in payment terminals is becoming an increasingly important factor that differentiates between different terminal providers.

It is often difficult to incorporate radio transmission functions while reconciling the constraints related to the different functions of these payment terminals. The constraints in terms of mechanical safety and electronic architecture as well as cost do not favor maximum radiated performance in the radio link. This is what is usually observed in small-sized devices where the antenna is situated relatively close to the electronic system of the payment terminal. This is more particularly the case with "portable" terminals. Portable terminals are terminals intended for use in situations of mobility. A typical case of a use of a portable payment terminal can, for example, be a taxi. The taxi driver can have a portable payment terminal at his disposal and use it to get paid by customers wishing to pay by bank card. Another situation in which this type of terminal is encountered is that of health care professionals (doctors or nurses) who make house visits to their patients and use a payment terminals both to get paid by patients and, for example, to carry out remote transmission of prescription data or medical data to given administrative centers. In the latter case for example, the payment terminal has an embedded professional card reader enabling the health care professional to insert his professional card therein. Depending on the country and on legislation, other examples and uses of portable terminals are clearly possible. Be that as it may, these uses however require high-performance access to cell networks of the telecommunications operators to enable efficient execution of the transactions.

It is therefore desirable to shift the position of the radio communications antenna away into an "isolated" zone in which its radiation does not disturb other devices such as cameras, barcode readers or other communications antennas.

These uses have led manufacturers, seeking to reconcile the different constraints to the utmost, and to enable adequate antenna radiation as well as sufficient isolation in the face of different noise sources, to resort frequently to a technique of shifting the position of antenna to a more or less standardized zone. Thus, most payment terminal manufacturers insert the cell communications antenna (GPRS, UMTS, LTE), either in the printer unit (a unit comprising the paper roll used to print out receipts) or laterally to one of the sides of the payment terminal. The position of the antenna in this zone has an essentially historical origin: at a time when the number of functions and the number of communications standards for payment terminals was limited, this positioning seemed to be natural because the antenna was positioned partly at the top of the terminal. This positioning resembled the positioning of the antenna then found in portable telephones. This positioning has lasted up to the present day.

However, these positions are sub-optimal. For example, when located in the printer unit, the cell communications antenna receives interference: the interference received comes from the contactless communications antenna. Contactless communications antennas are actually often situated in proximity to the screen of the payment terminal and therefore also in proximity to the printer unit. They therefore generate noise.

3. SUMMARY OF THE INVENTION

The present disclosure resolves the problems posed by these prior-art terminals and relates to a radio-electric antenna. Such an antenna is shaped so that it can be positioned in proximity to an insertion hole of a smart-card reader of a payment terminal.

Thus, the antenna has the benefit of better electromagnetic radiation and participates in the absorption of the electrostatic discharge that occurs when a smart card is inserted into the smart-card reader of the payment terminal. The antenna then fulfils two functions *and plays a part in the compactness of the payment terminal into which it is inserted.

According to one particular characteristic, the radio-electric antenna is constituted at least partly by a metal plate or sheet.

Thus, the antenna is economically advantageous to manufacture.

According to one particular embodiment the radio-electric antenna comprises an upper surface, a rim and at least one connection pad, said connection pad comprising a first part parallel to said upper surface and perpendicular to said rim.

According to one particular embodiment, the assembly formed by said upper surface, said rim and said first part of said at least one connection pad is shaped so that it fits into one side of a light guide present in the payment terminal.

Thus, the antenna can easily be mounted into the payment terminal. This mounting does not require any complicated handling operation.

According to one particular embodiment, said at least one connection pad furthermore comprises at least one third part, called a connection part, shaped to come into contact with a connection zone of a printed circuit of the payment terminal.

Thus, it is not necessary to make a soldering of the antenna.

The technique also relates to a light guide shaped to receive, on one of its sides, an antenna as described here above. More particularly, the light guide is shaped to enable an antenna to be fitted into its inner side, in proximity to the smart-card reader.

The technique also relates to a payment terminal comprising a smart-card reader, characterized in that it comprises a radio-electric antenna as described here above. The technique also relates to such a terminal incorporating a light guide, said light guide being used to position the antenna in proximity to the smart-card reader of the terminal.

4. FIGURES

Other features and advantages of the invention shall appear more clearly from the following description of a particular embodiment of the disclosure, given by way of a simple illustratory and non-exhaustive example and from the appended drawings, of which:

5. DESCRIPTION

As explained here above, the payment terminal needs to be given high performance in radio transmission, especially for radio transmission made in the context of data transmission using the services of an operator's mesh network based, for example, on 2G, 3G or 4G technologies. To this end, the inventors have had the idea of shifting the position of the 2G/3G/4G radio-communications antenna close to the smart-card reader of the payment terminal. Unlike the standard approach described here above, in which the antenna is shifted to the paper roll in the printer, the inventors have made the opposite choice: the antenna is situated not in the upper part of the terminal (the part comprising the printer screen, the paper roll etc.) but in its lower door (the part containing, for example, the smart-card reader, the keypad etc.).

Figure 1:
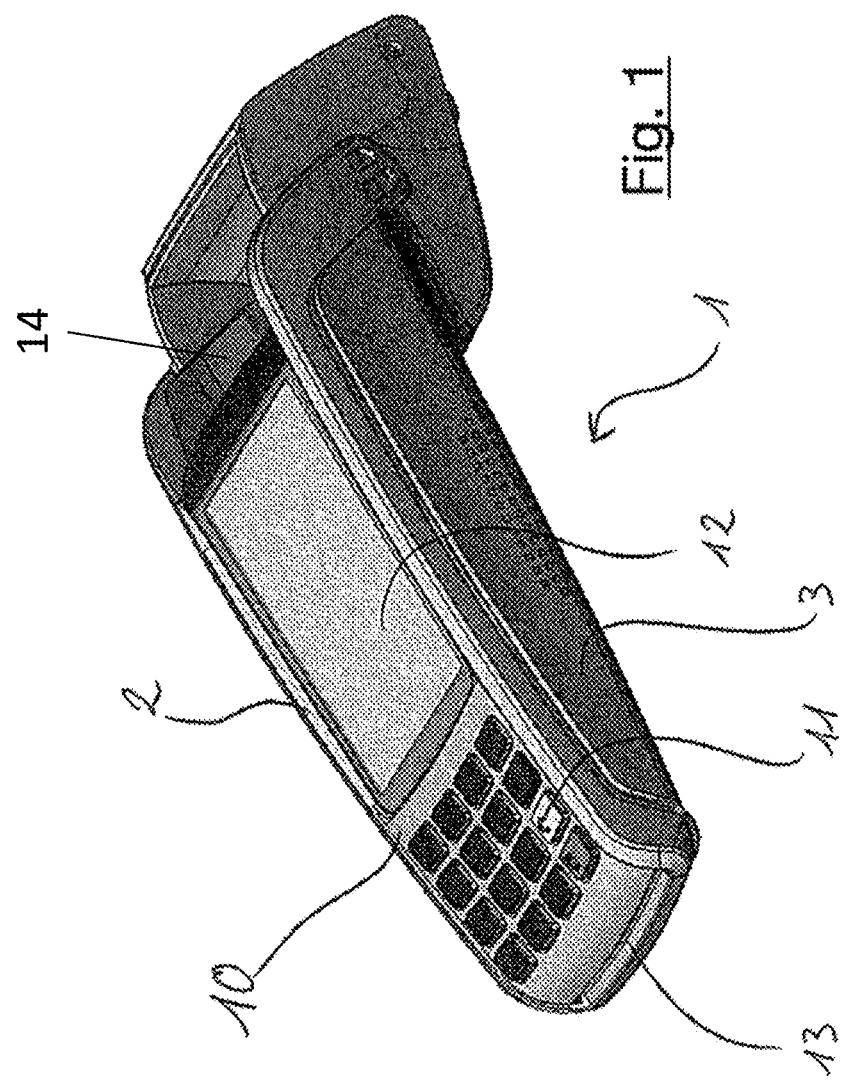
FIG. 1 is a three-quarter or perspective view, seen from the top, of a prior-art electronic payment terminal.

FIG. 1 represents a prior-art electronic payment terminal 1 that comprises especially a keyboard 11, a screen 12 and a smart-card reader 13 enabling the use of a smart card. These different components, as well as electronically visible components, are grouped together in a case 10 which is itself formed by an upper half-shell 2 assembled on a lower half-shell 3. The 2G/3G radio communications antenna is generally situated at the position of the roll of the printer 14.

According to the proposed technique, on the contrary, the antenna is positioned in the smart-card reader 13. Such a position is advantageous for more than one reason: on the one hand, this position is less disturbed than the other positions; on the other hand, such a position promotes electrostatic discharge from the smart card when it is inserted into the smart-card reader. The fact is that the radio-communications antenna, which close to the smart card, then acts as static electricity absorber. Now it is important that the smart card should be discharged before the chip of the smart card comes into contact with the connector inside the smart-card connector. Usually, the manufacturers resolve the problem of electrostatic discharge by providing specific discharging means at the smart-card reader. Through the proposed technique, the antenna also plays this role of discharging and therefore limits or (in certain cases) even totally eliminates the need for other electrostatic discharge devices.

Figure 2:
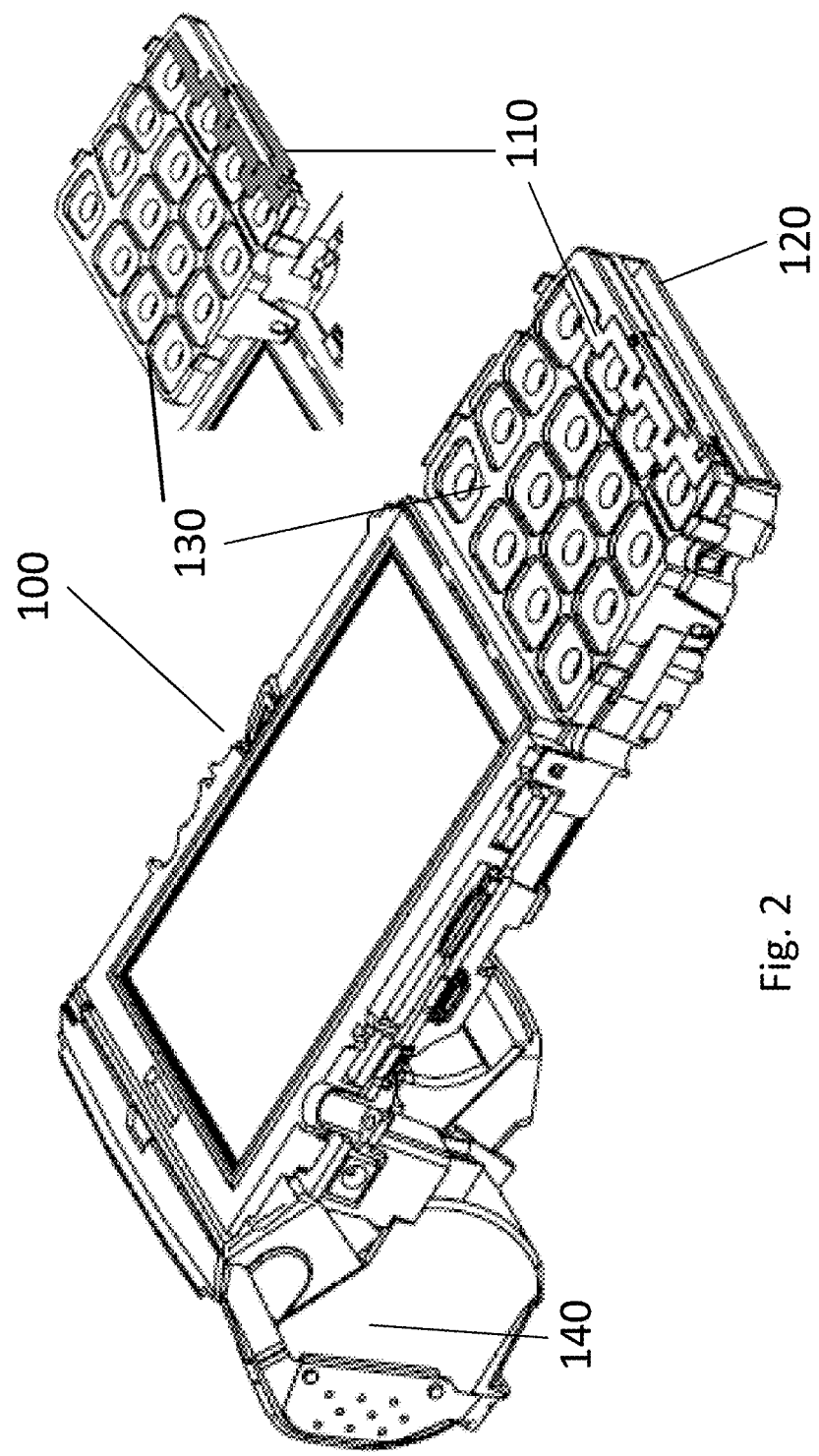
FIG. 2 is a schematic view of a payment terminal (the casing and the keyboard are not illustrated) according to one embodiment of the invention.

FIG. 2 is a schematic view of a payment terminal according to one embodiment of the invention. It can be noted that the internal structure of the terminal, which is not relevant to the present invention, is not shown in the figures. The casing and the keypad are not illustrated and the internal components are masked. This payment terminal 100 incorporates wireless telecommunications means (2G, 3G, 4G, Wifi, Bluetooth® etc.) and especially comprises a bank-card reader 120, a light guide 130 and an antenna 110. The antenna 110 is situated in the bank-card reader 120. The value of this is feature that this position is less subject to parasitic interference than the position at which this antenna is usually situated. Indeed, the usual position, in the middle of the payment terminal or in its top part, a place where the printer and its paper roll housing 140 are generally situated, is becoming increasingly cluttered. Besides, other positions (on the sides of the terminal) are situated in proximity to disturbing or sensitive elements such as the barcode reader, the camera, etc. To facilitate assembly, this antenna 110 gets be fitted into the light guide 130 prior to its assembly as illustrated in the drawing at the upper right-hand of FIG. 2. The light guide is a transparent element, the main function of which is to guide light towards a touchpad, which is itself made out of relatively transparent material. In this embodiment, the light guide takes the form of a rectangular parallelepiped, the length of which is a function of the length of a first pre-determined number of keys of said keypad and the width of which is a function of the width of a second pre-determined number of keys, the thickness of which is a function of the thickness of the terminal in which the light guide is situated.

By way of indication, in one embodiment, the light guide has the following dimensions: 43 millimeters wide, 60 millimeters long (or 63 in a large size) and 3.5 millimeters thick. The light guide comprises two lateral tabs, extending in a substantially vertical direction, these tabs each comprising an oblong hole extending in a substantially vertical direction and enabling the light guide to be assembled with the internal structure of the payment terminal in a simple and efficient way. The light guide is therefore pressed onto the motherboard 350 (FIG. 4) of the payment terminal during the final assembly. This is a light guide of the type described in the patent application FR1553778 incorporated herein by reference.

Figure 3:
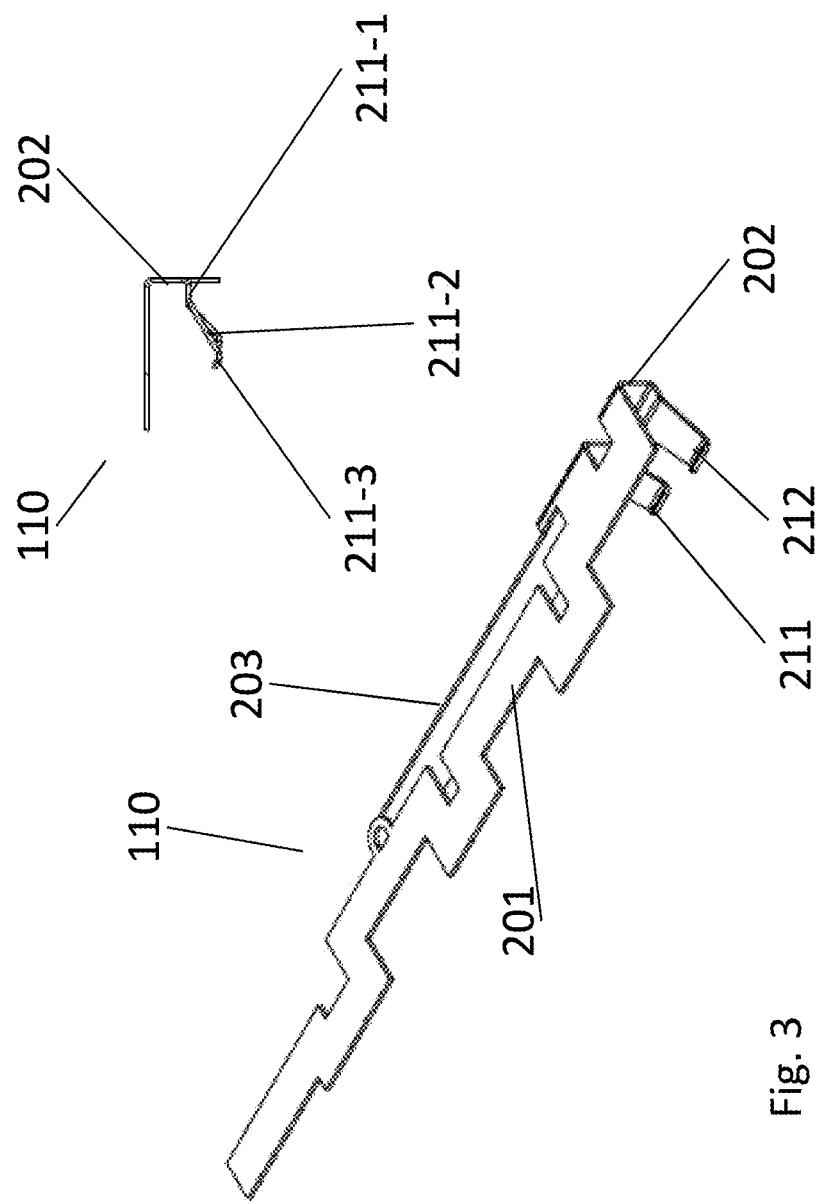
FIG. 3 illustrates the shape of the antenna according to one embodiment of the invention.

As illustrated in FIG. 3, the antenna 110 takes the form of a metal plate comprising two connection pads 211, 212 in its lower part. This antenna is designed so that the assembly formed by the antenna plus the support matches the desired frequencies such as the 850/900/1800/1900/2100 bands for 2G, 3G, LTE or 2.4 GHz band for Bluetooth® or Wi-Fi. This design takes account of the nearer environment constituted by the bank-card reader and the keypad. The antenna perfectly "fits with" these elements in order to optimize the compactness of the product to the utmost. As an indication, in one embodiment, the antenna has the following dimensions: 55 millimeters long, 7 millimeters wide and 4 millimeters thick. In this embodiment, the antenna is slightly thicker than the light guide into which it is fitted. This antenna could, in another embodiment, be provided with an additional strand (for another, additional frequency such as the LTE frequency for example) and thus get bigger by "surrounding" the "farthest" part of the memory-card reader and thus "become thicker" by 6 mm. The thickness would then be taken to 10 mm (the thickness of the memory-card reader being 4 mm). This second example increases the electrostatic discharging capacity of the antenna. Thus, the antenna is situated in proximity to the smart-card insertion hole in the smart-card reader. In the context of the present invention, it can be estimated that the feature of proximity of the antenna is defined by a distance of less than 1 cm between the antenna and the smart-card insertion hole. In the embodiment presented, this distance is situated between 2 and 4 millimeters depending on the thickness of the memory-card reader.

As indicated here above, the antenna fits into the light guide to facilitate the mounting. Thus, for example, a complicated step of soldering an antenna to the terminal is avoided. The shape of the antenna, which matches the shape of the light guide, is promising in that it enables easy assembly. Besides, the two connection pads 211, 212 do not need to be soldered. It is enough for the pads to come into contact with two corresponding connection points of the motherboard. The pads on the whole have a first part (211-1), parallel to the upper surface of the antenna (201) and perpendicular to the rim (202) of the antenna. The assembly constituted by the upper surface, the rim and the first part of the pads is sized to get fitted into the light guide, in proximity to the smart-card insertion hole. The pad also comprises a second, plunging part (211-2), the length of which is adapted to the position of the corresponding connection point on the motherboard of the terminal. The pad also comprises a third part (211-3), called a connection part, which is effectively in contact with the connection point. The antenna also comprises, in proximity to the rim (202) that comprises the connection pads, a transmission rim 203 in proximity to the insertion hole of the memory-card reader. This rim can be seen more clearly in FIG. 2 where it is colored gray.

Figure 4:
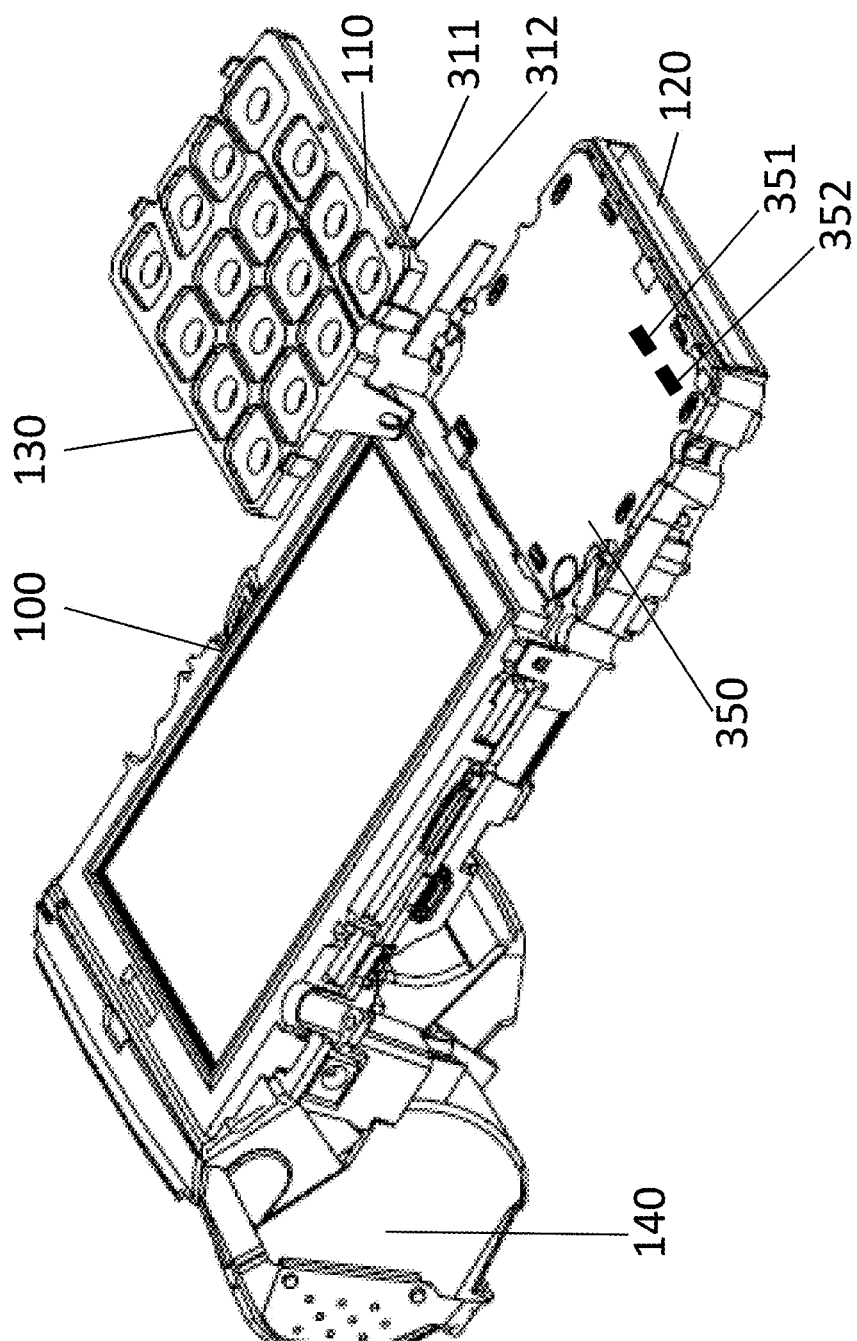
FIG. 4 illustrates the mounting of the antenna on the light guide of the payment terminal.

FIG. 4 illustrates the payment terminal 100 on which the light guide 130 and the antenna 310 are not yet mounted. The payment terminal 100 comprises a motherboard 350, a bank-card reader 120 and a paper roll housing 140. When the light guide 130 is pressed on the motherboard 350, these two connection pads 311, 312 come into contact with two corresponding connection points 351, 352 on the motherboard 350. Thus, the connection pads 311, 312 fulfill a twofold function: fastening the antenna and connecting the antenna with the RF circuit on the motherboard. Thus, in this embodiment, there is no longer any "added-on" element (such as a coaxial cable or a connector) between the antenna proper and the radio module. The result of this is to simplify the mounting of the terminal, on the one hand, and lower production costs for the terminal on the other hand. Indeed, a relatively costly antenna is thus replaced by a lower-cost folded metal sheet plate.

Figure 5:
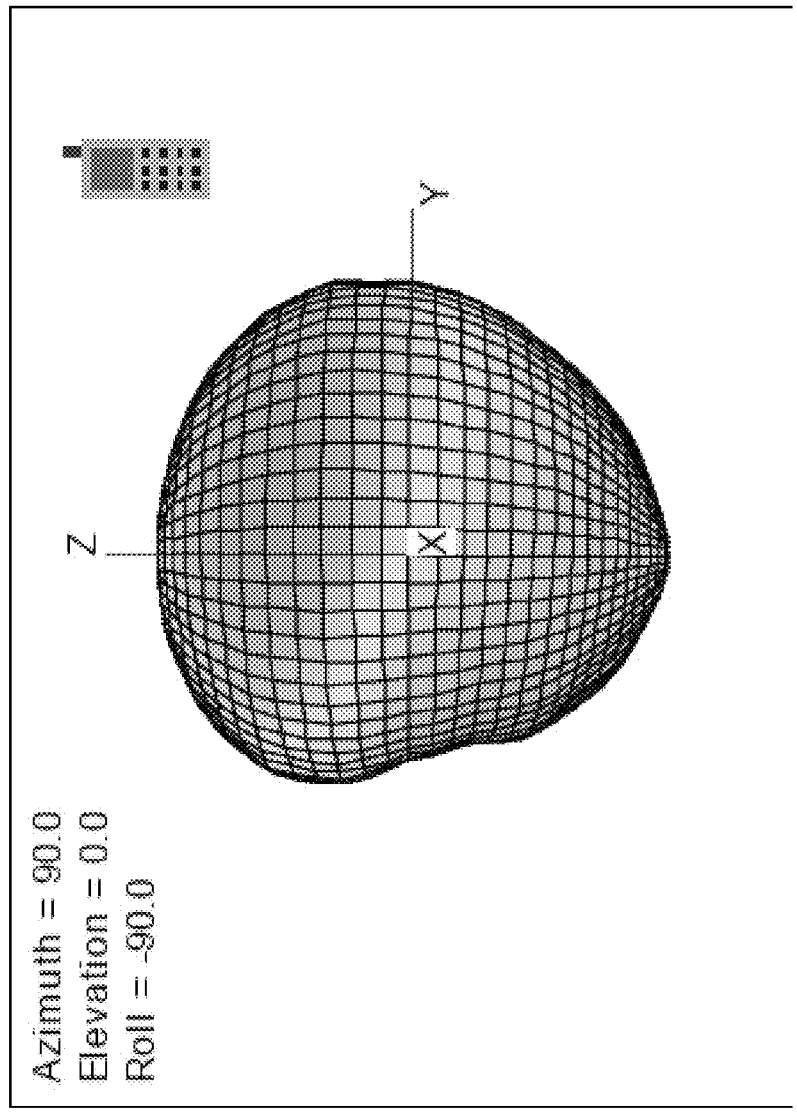
FIG. 5 shows a radiation pattern or beam pattern of the antenna according to the invention.

The shape of the metal sheet of the antenna and its positioning are adapted to producing an optimized transmission pattern in order to give the highest performance. A "typical" pattern of one embodiment of the invention is thus seen in FIG. 5.

Figure 6:
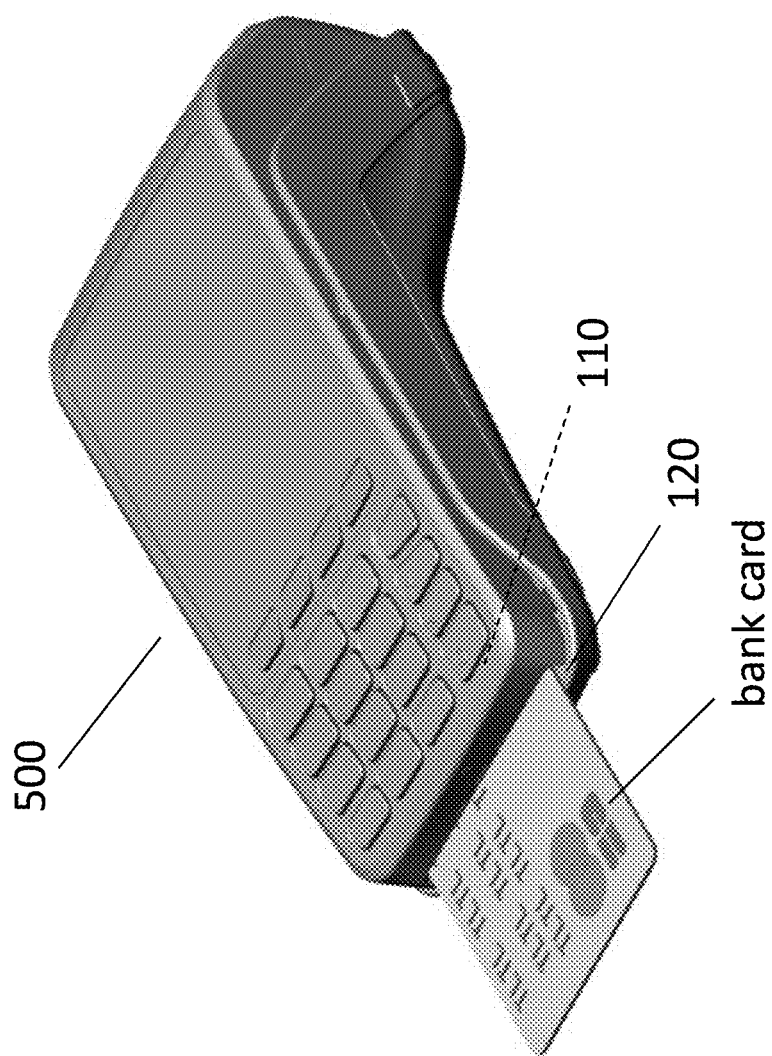
FIG. 6 shows a payment terminal according to the invention when it is being used.

FIG. 6 shows a payment terminal 500 according to the invention where it is used. A bank card is inserted into the card reader 120 of the terminal. The antenna 110 (which is invisible in FIG. 6) is situated in the reader of the bank card 120 and above the bank card. The positioning of the antenna enables it to absorb a part of the electrical discharge when the card is inserted into the reader. The closest element on the path of the card during its insertion is said antenna, the electrical discharge flowing in a preferred manner through the antenna and its mass point thus enabling a reduction of the risk of damaging the payment terminal.

The invention claimed is:
1. A payment terminal comprising:
a smart-card reader; and
a radio-electric antenna wherein said radio-electric antenna comprises a transmission rim positioned in proximity to an insertion hole of the smart-card reader, so that said antenna absorbs a part of an electrostatic discharge of a smart card when said smart card is inserted into said smart-card reader.
2. The payment terminal according to claim 1, wherein said radio-electric antenna is constituted at least partly by a metal plate.
3. The payment terminal according to claim 1, wherein said radio-electric antenna comprises an upper surface, the transmission rim and at least one connection pad, said connection pad comprising a first part, parallel to said upper surface and perpendicular to said rim.
4. The payment terminal according to claim 3, wherein an assembly formed by said upper surface, said rim and said first part of said at least one connection pad is shaped to fit into one side of a light guide present in the payment terminal.
5. The payment terminal according to claim 3, wherein said at least one connection pad furthermore comprises at least one other part, called a connection part, shaped to come into contact with a connection zone of a printed circuit of the payment terminal.
6. The payment terminal according to claim 1, wherein said radio-electric antenna is fitted into a light guide.
7. The payment terminal according to claim 6, wherein said light guide is in the form of a rectangular parallelepiped.
8. A payment terminal comprising:
a smart-card reader; and
a radio-electric antenna wherein said radio-electric antenna is positioned in proximity to an insertion hole of the smart-card reader, so that said antenna absorbs a part of an electrostatic discharge of a smart card when said smart card is inserted into said smart-card reader, wherein said radio-electric antenna comprises an upper surface, a rim and at least one connection pad, said connection pad comprising a first part, parallel to said upper surface and perpendicular to said rim.
9. A payment terminal comprising:
a circuit board comprising a radio frequency (RF) circuit and at least one RF connection pad on the circuit board;
a smart-card reader; and
a radio-electric antenna wherein said radio-electric antenna is positioned in proximity to an insertion hole of the smart-card reader, so that said antenna absorbs a part of an electrostatic discharge of a smart card when said smart card is inserted into said smart-card reader, wherein said radio-electric antenna comprises at least one electrical RF connection pad that is in electrical contact with the at least one RF connection pad on the circuit board.
10. The payment terminal according to claim 9, wherein said radio-electric antenna is at least partially positioned along an edge of the payment terminal that comprises the insertion hole.

* * * * *